(12) United States Patent
Zhang et al.

(10) Patent No.: US 6,381,646 B2
(45) Date of Patent: *Apr. 30, 2002

(54) MULTIPLE NETWORK CONNECTIONS FROM A SINGLE PPP LINK WITH PARTIAL NETWORK ADDRESS TRANSLATION

(75) Inventors: Shujin Zhang, San Mateo; Jane Jiaying Jin, San Jose; Jie Chu, Los Altos; Maria Alice Dos Santos, Redwood City; Shuxian Lou, San Jose, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,214

(22) Filed: Nov. 3, 1998

(51) Int. Cl.$^7$ ............................................... G06F 15/16
(52) U.S. Cl. ........................ 709/227; 709/244; 709/245; 709/249
(58) Field of Search ................................ 709/217, 218, 709/223, 224, 238, 243, 244, 245, 227, 228, 249

(56) References Cited

U.S. PATENT DOCUMENTS

| | | | |
|---|---|---|---|
| 5,241,594 A | 8/1993 | Kung | 380/4 |
| 5,502,725 A | 3/1996 | Pohjakallio | 370/94.1 |
| 5,555,244 A | 9/1996 | Gupta et al. | 370/60.1 |
| 5,583,862 A | 12/1996 | Callon | 370/397 |
| 5,592,470 A | 1/1997 | Rudrapatna et al. | 370/320 |
| 5,617,417 A | 4/1997 | Sathe et al. | 370/394 |

(List continued on next page.)

FOREIGN PATENT DOCUMENTS

WO          99/53408          10/1999          ........... G06F/15/16

OTHER PUBLICATIONS

Martin Bligh, TCP/IP Blueprints, Jun. 1997, Chapters 7.2.2, 4 pages and 7.4.3., 3 pages, Sams, Macmillan Computer Publishing.*
Rekhter et al., RFC 1597: Address Allocation for Private Internets, Mar. 1994, 6 pages.*
Egevang et al., RFC 1631: The IP Network Address Translator (NAT), May 1994, 7 pages.*
Carrel, D. et al., The TACACS+ Protocol, Version 1.78, Cisco Systems, Inc., printed from ftp://ftp-eng.cisco.com/edweber/tac-rfc.1.78.txt on Oct. 23, 2000.
Active Software, Inc., "Active Software's Integration System", printed from http://www.activesw.com/products/products.html, on Jul. 24, 1998.

(List continued on next page.)

*Primary Examiner*—Patrice Winder
(74) *Attorney, Agent, or Firm*—Thelen Reid & Priest LLP; Marc S. Hanish

(57) ABSTRACT

Multiple simultaneous network connections from a single PPP connection may be accomplished. A primary PPP connection is established between a user and a first network. A first real network address for the user is then received, the first real network address assigned by the first network. Then, the gateway may establish a secondary network session between a gateway and a second network, receiving a second real network address assigned by the second network. Additional network connections may be added as secondary network sessions. Network address translation is then performed on packets traveling between the user and any of the secondary network sessions, but not on packets traveling between the user and the primary PPP connection. This allows for connection to multiple networks without disturbing the primary PPP session and also allows for the utilization of applications which may not be used with network address translation on the primary PPP session.

91 Claims, 5 Drawing Sheets

U.S. PATENT DOCUMENTS

| | | | |
|---|---|---|---|
| 5,655,077 A | 8/1997 | Jones et al. | |
| 5,671,354 A | 9/1997 | Ito et al. | 395/187.01 |
| 5,673,265 A | 9/1997 | Gupta et al. | 370/432 |
| 5,684,950 A | 11/1997 | Dare et al. | |
| 5,715,394 A | 2/1998 | Jabs | |
| 5,740,171 A | 4/1998 | Mazzola et al. | 370/392 |
| 5,740,176 A | 4/1998 | Gupta et al. | 370/440 |
| 5,793,763 A | 8/1998 | Mayes et al. | 370/389 |
| 5,799,017 A | 8/1998 | Gupta et al. | 370/419 |
| 5,802,047 A | 9/1998 | Kinoshita | 370/359 |
| 5,812,529 A | 9/1998 | Czarnik et al. | 370/245 |
| 5,852,721 A * | 12/1998 | Dillon et al. | 709/217 |
| 5,854,901 A | 12/1998 | Cole et al. | 395/200.75 |
| 5,944,824 A | 8/1999 | He | 713/201 |
| 5,991,810 A | 11/1999 | Shapiro et al. | 709/229 |
| 5,991,828 A | 11/1999 | Horie et al. | 710/8 |
| 6,009,103 A | 12/1999 | Woundy | 370/401 |
| 6,011,910 A | 1/2000 | Chau et al. | 395/200.59 |
| 6,018,770 A | 1/2000 | Little et al. | 70/223 |
| 6,021,496 A | 2/2000 | Dutcher et al. | 713/202 |
| 6,023,724 A * | 2/2000 | Bhatia et al. | 709/218 |
| 6,026,441 A | 2/2000 | Ronen | 709/227 |
| 6,055,236 A * | 4/2000 | Nessett et al. | 709/245 X |
| 6,091,951 A | 7/2000 | Sturniolo et al. | 455/432 |
| 6,092,196 A | 7/2000 | Reiche | 713/200 |
| 6,112,245 A * | 8/2000 | Araujo et al. | 709/228 |
| 6,119,160 A | 9/2000 | Zhang et al. | 709/224 |
| 6,141,687 A | 10/2000 | Blair | 709/225 |

OTHER PUBLICATIONS

Ascend Communications, Inc., "Access Control Product Information", 4 pages.

Ascend Communications, Inc., "Remote Access Network Security", printed from http://www.ascend.com/1103.html, on Jul. 24, 1998, pp. 1–8.

Droms, R., "Dynamic Host Configuration Protocol," Network Working Group, RFC 1531, Oct. 1993, 35 pgs.

NAT and Networks, printed from http://www.csn.tu–chemnitz./~mha/linux–ip–nat/diplom/node4.html, on Sep. 19, 1998, 12 pgs.

"NAT–PC Webopaedia Definition and Links", 1998, Mecklermedia Corporation, printed from http://webopedia.internet.com/TERM/N/NAT.html, on Sep. 19, 1998, 1 page.

"Network Address Translation Information", printed from http://www.uq.edu.au/~gadmacka/content/natinformation.htm, on Sep. 19, 1998, 2 pgs.

Perkins, D., "Requirements for an Internet Standard Point–to–Point Protocol", Dec. 1993, Network Working Group, RFC 1547, pp. 1–19.

Rigney, et al., "Remote Authentication Dial In User Service (RADIUS)", Network Working Group, RFC 2138, Apr. 1997, pp. 1–57.

Simpson, W., "The Point–to–Point Protocol (PPP)", Dec. 1993, Network Working Group, RFC 1548, pp. 1–53.

* cited by examiner

MULTIPLE NETWORK CONNECTIONS FROM A SINGLE PPP LINK WITH PARTIAL NETWORK ADDRESS TRANSLATION

BACKGROUND OF THE INVENTION

1. Field of the Invention

The present invention relates to the field of computer networks. More particularly, the present invention relates to managing multiple network connections from a single PPP link with partial network address translation.

2. The Background

The Point-to-Point protocol (PPP) is a data link protocol that provides dial up access over analog or digital transmission lines. PPP provides many advanced features, including error detection, support of multiple protocols, negotiation of IP addresses at connection time, and authentication. There are three main features of PPP. The first is that it provides a framing method to delineate the end of one frame and the beginning of the next one, in order to handle error detection. The second is a link control protocol for bringing lines up, testing them, negotiating options, and bringing them down again when they are no longer needed. This is known as the Link Control Protocol (LCP). The third is a way to negotiate network layer options in a way independent of the network layer protocol to be used. Thus, the method chosen may have a different Network Control Protocol (NCP) for each network layer supported.

PPP is commonly used as the data link protocol between a user and an Internet Service Provider (ISP) or access point. This is usually accomplished through the following method. The personal computer of the user is instructed to call the ISP through a modem . After the ISP's modem receives the call and establishes a physical connection, the personal computer sends a series of LCP packets in the payload field of one or more PPP frames. These packets, and their responses, comprise the negotiation of the session, and set the PPP parameters to be used during the session.

Once the negotiation is complete, a series of NCP packets are sent to configure the network layer. Typically, the personal computer wants to run a TCP/IP protocol stack, so it needs an IP address. The NCP for IP may then be used to assign an IP address to the user (dynamic assignment of IP addresses is now common for dial-up users). At this point, the personal computer has become an Internet host and may send and receive IP packets, just as a hardwired host could. When the user has finished, NCP is used to tear down the network layer connection and free the IP address. The LCP is then used to shut down the data link layer connection. Finally, the personal computer hangs up the modem, releasing the physical layer connection.

There are currently eleven types of LCP packets. These types are illustrated in Table 1 below, along with the direction in which they travel (from Initiator (I) to responder (R) or vice-versa) and their description.

In recent years, "intranets" have been rising in popularity, especially with large companies. An intranet is an internal network that serves only a specific type of person (such as employees of a corporation, or students at a school). The intranet is usually not accessible to the general public. Intranets have become popular mainly because they allow for much more productive communication between users within the network,

TABLE 1

| Name | Direction | Description |
| --- | --- | --- |
| Configure-request | I → R | List of proposed options and values |
| Configure-ack | I ← R | All options are accepted |
| Configure-nak | I ← R | Some options are not accepted |
| Configure-reject | I ← R | Some options are not negotiable |
| Terminate-request | I → R | Request to shut down the line |
| Terminate-ack | I ← R | OK to shut down the line |
| Code-reject | I ← R | Unknown request received |
| Protocol-reject | I ← R | Unknown protocol received |
| Echo-request | I → R | Please send this frame back |
| Echo-reply | I ← R | Here is the frame back |
| Discard-request | I → R | Discard this frame (for testing) | even when the users are dispersed over a wide geographic area (such as in multi-national corporations).

FIG. 1 is a block diagram depicting the typical connection to an intranet. Personal computer 10 connects through a link 12 to an Internet service provider (ISP) or access point (AP)14. The ISP or AP 14 then connects through link 16 to the Intranet 18.

Many entities that maintain intranets, however, have also wanted to offer users access to the Internet or to other intranets as well. There were, however, a limited number of ways that this could be accomplished. The first, and most simple, way would be for the user to first terminate the existing PPP connection between the PC 10 and the ISP or access point 24. Then the user could log into a second intranet or to the Internet. The major drawbacks of this solution are obvious. It does not allow for simultaneous connection to two intranets, or to one intranet and the Internet, thus limiting the productivity of the user. Additionally, it requires termination of the PPP link between the PC and the ISP, thus using up valuable time on the user's end, as he has to re-initiate a connection process.

The second way an entity could offer access to a second intranet or to the Internet is to have a preconfigured connection from the intranet to the second intranet or Internet, such that communications between the user and the second intranet or Internet pass through the intranet. FIG. 2 is a block diagram illustrating a connection to the Internet 62 through an intranet 58. A user at PC 50 maintains a PPP connection 52 to ISP 54, which is connected to the intranet 58. Intranet 58 is then connected through link 60 to the Internet 62. The drawback of this solution is that the traffic from the user at PC 50 to the Internet 62 passes through the intranet 58. This increases the traffic traveling through the intranet 58 and poses a security risk to the information sent via the intranet 58.

One major drawback of PPP, therefore, is that it is designed as a point to point protocol, meaning that it is designed for use between two endpoints. Therefore, it is currently not possible for a user to connect to two independent endpoints simultaneously (such as an intranet and the Internet, or to two independent intranets) using a single PPP link.

What is needed is a method by which a user may connect to two independent endpoints simultaneously using a single PPP link.

Additionally, when a system is designed in which data is to be sent to the Internet, Network address translation (NAT) is sometimes used. NAT is an Internet standard that enables a local-area network (LAN), intranet, or ISP to use one set of network addresses for internal traffic and a separate set of network addresses for external traffic. Network addresses are generally Internet Protocol (IP) addresses, but there are many other possible network addresses as well. At the ISP level, there is normally a gateway, which is a device that acts as an interface between the ISP and the intranet or Internet. When network address translation is used, the Gateway will act to convert the destination addresses of incoming and outgoing packets so that traffic is directed to the correct address.

Network address translation provides two main advantages. First, it adds security to the LAN or intranet, as it acts as a type of firewall, preventing users from outside the LAN or intranet from determining the internal network addressing scheme of the LAN or intranet. Second, it saves network addresses. With the ever growing popularity of the Internet and computer networks, a major issue is the availability of IP addresses. A standard IP address is 32 bytes in length, providing a total of $2^{32}$ possible IP addresses. Those of ordinary skill in the art will readily recognize that not all of these possible IP addresses are available due to administrative expediencies, such as reserving blocks of IP addresses for future use. Network address translation saves IP addresses by allowing the ISP to use IP addresses internally that may be used by other networks on the Internet because there is no possibility of conflict.

There are several drawbacks, however, to using NAT. The first is that it is slightly more inefficient than not using NAT, since each packet must then be examined by a gateway or router and the translation performed. Of greater importance, however, is the fact that there are several kinds of IP applications which are incompatible with a system in which NAT is being used. These include any type of application which encrypts the header of the IP packet. One example of this is the IP security protocol (IPSec). IPSec encrypts the entire IP packet (header included) and only allows decryption at an endpoint with access privileges to the header. Since the header is encrypted, NAT will alter the packet so that the receiver of the packet will not accept the packet.

What is needed is a solution which overcomes these drawbacks.

SUMMARY OF THE INVENTION

Multiple simultaneous network connections from a single PPP connection may be accomplished. A primary PPP connection is established between a user and a first network. A first real network address for the user is then received, the first real network address assigned by the first network. Then, the gateway may establish a secondary network session between a gateway and a second network, receiving a second real network address assigned by the second network. Additional network connections may be added as secondary network sessions. Network address translation is then performed on packets traveling between the user and any of the secondary network sessions, but not on packets traveling between the user and the primary PPP connection. This allows for connection to multiple networks without disturbing the primary PPP session and also allows for the utilization of applications which may not be used with network address translation on the primary PPP session.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In accordance with a presently preferred embodiment of the present invention, the components, process steps, and/or data structures are implemented using a gateway device. Different implementations may be used and may include other types of operating systems, computing platforms, computer programs, and/or general purpose machines. In addition, those of ordinary skill in the art will readily recognize that devices of a less general purpose nature, such as hardwired devices, devices relying on FPGA or ASIC technology, or the like, may also be used without departing from the scope and spirit of the inventive concepts disclosed herewith.

Figure 1:
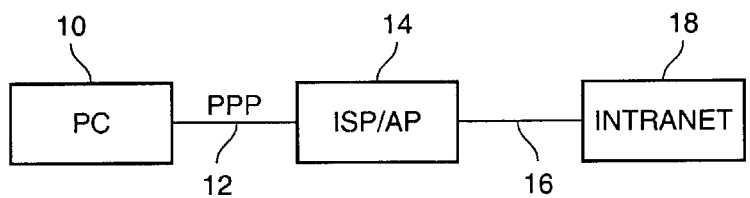
FIG. 1 is a block diagram depicting a typical connection to an intranet.
Figure 2:
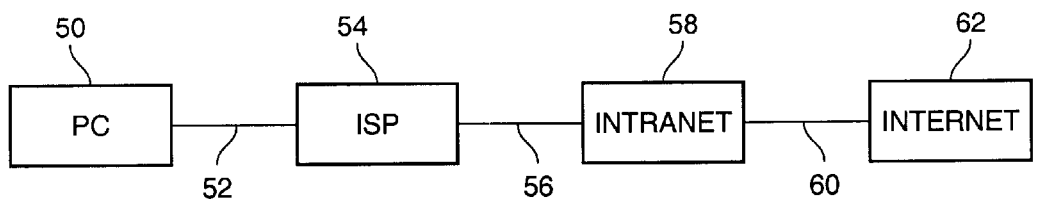
FIG. 2 is a block diagram illustrating a connection to the Internet through an intranet.
Figure 3:
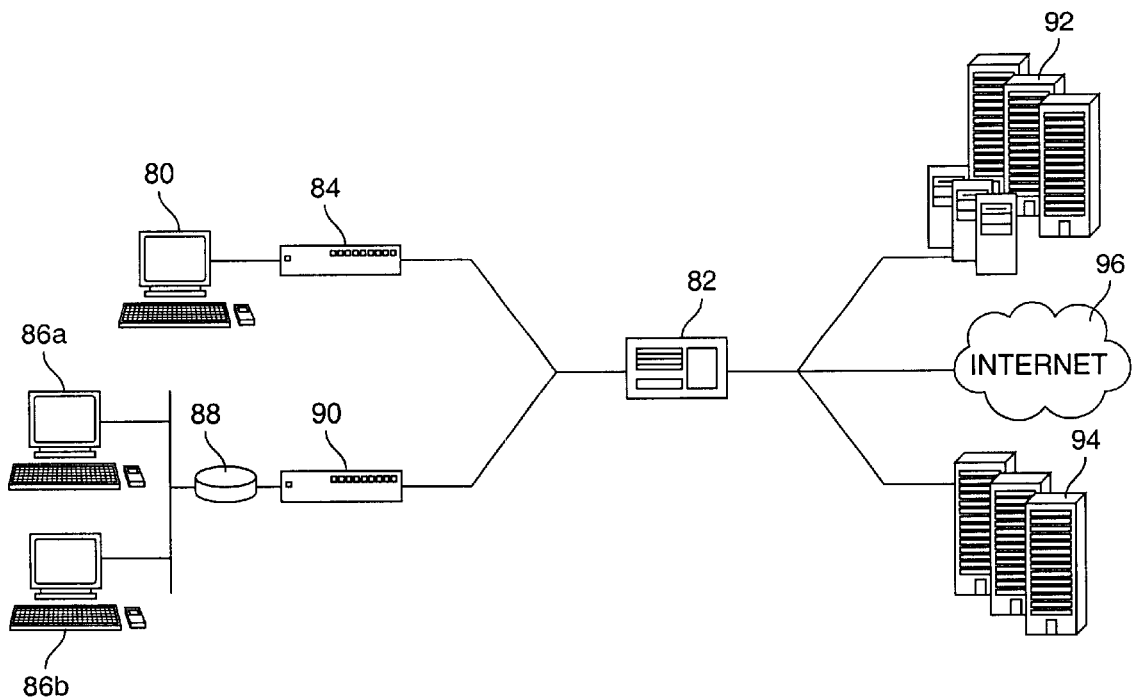
FIG. 3 is a diagram illustrating the use of a gateway to couple multiple networks according to a presently preferred embodiment of the present invention.

A method for making multiple network connections with only partial network address translation is provided. This method may be executed by a gateway. A gateway is a device which performs protocol conversion between different types of networks or applications. The term gateway is not meant to be limited to a single type of device, as any device, hardware or software, that may act as a bridge between the user and the networks may be considered a gateway for purposes of this application. FIG. 3 is a diagram illustrating the use of a gateway to couple multiple networks. Computer 80 connects to gateway 82 through a modem 84, while computers 86a and 86b couple to a hub 88, then through modem 90 to gateway 82. Gateway 82 may then interface computers 80, 86a, and 86b to multiple networks. These may include a first corporate intranet 92, a second corporate intranet 94, and the Internet 96.

Figure 4:
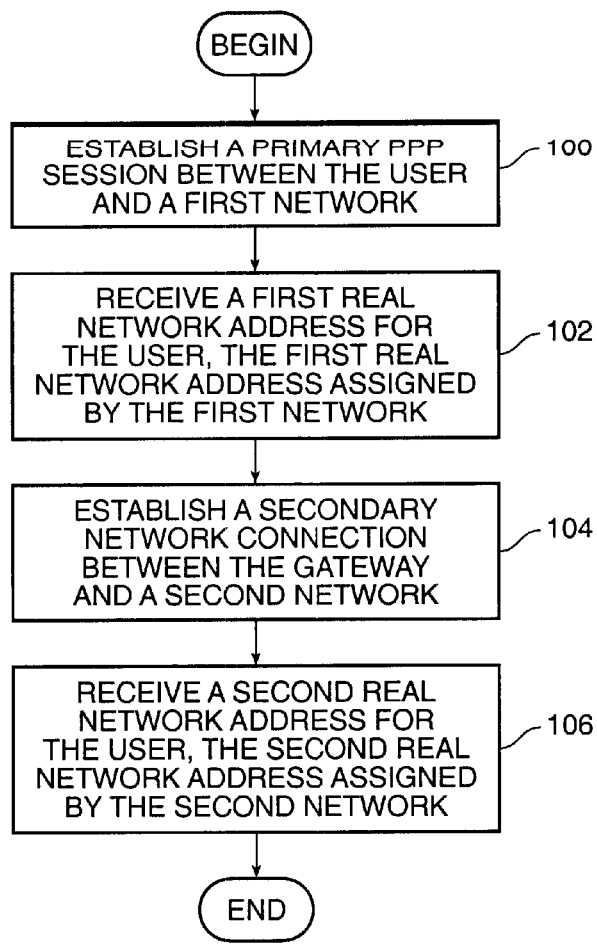
FIG. 4 is a flow diagram illustrating a method for establishing multiple network connections for a user having a PPP connection to a gateway according to presently preferred embodiment of the present invention.

FIG. 4 is a flow diagram illustrating a method for establishing multiple network connections for a user having a PPP connection to a gateway according to presently preferred embodiment of the invention. At step 100, a PPP session is established between the user and a first network. This may have been performed in two separate steps. First, the user may have established a PPP session with the gateway. Second, the gateway may have then established a PPP session with the first network, thus extending the endpoint of the PPP session established by the user to the first network. This is known as a primary session because it is one contiguous session with the endpoints being the user and the first network. At step 102, a first real network address is received for the user. This first real network address is assigned by the first network. Since this is the primary session, it is likely that this network will be the dominant one for the user, meaning that this network is the one used the most by the user. For example, this connection will likely be the one that is used to connect to the intranet of the company of which the user is employed, since it is likely that more traffic will travel between the user and the first network than the user and the second network. However, there is no requirement that this primary session be linked to the dominant network or that the dominant network be a specific network.

Since the primary session will most likely have the most amount of traffic traveling on it, network address translation will not be performed on packets traveling through this session. This allows the user to utilize the various Internet applications that could not be used with NAT, such as IPSec. The utilization of IPSec or similar security protocols may also allay some of the security concerns regarding access to information on the first network.

At some point during the session, the user may request connection to a second network. Therefore, at step 104, the gateway may establish a secondary network session between the gateway and a second network. Unlike the primary session, there is no requirement that this session be a PPP session (although it may be). Therefore, this session may comply with any network protocol. At step 106, a second real network address for the user is received, the second real network address assigned by the second network. Since this is a secondary session, network address translation will be utilized. This may or may not require an action to be taken by the gateway at this point. Some forms of network address translation require that a NAT table be maintained. In such instances, the gateway may place the second real network address in a NAT table in an entry corresponding to the first real network address. There is no need to assign a virtual network address, since the first real network address may be used as the local address. Some forms of network address translation involve simply applying the network address translation scheme to each packet as it is received. In such instances, no steps need to be taken by the gateway until a packet is received.

Figure 5:
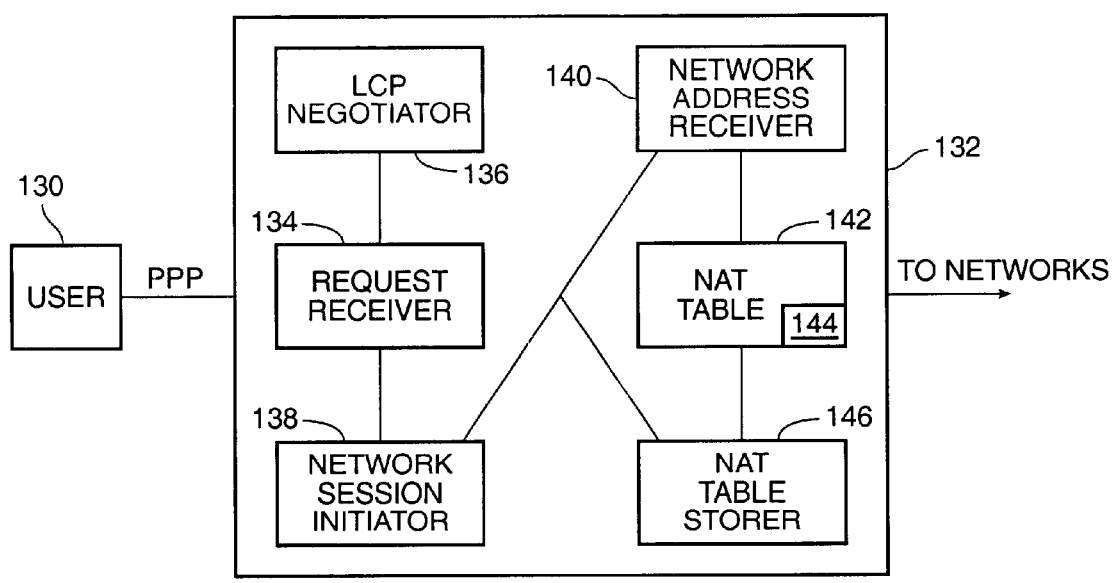
FIG. 5 is a block diagram illustrating a network gateway for use in a system having a user with a PPP connection to a gateway.

FIG. 5 is a block diagram illustrating a network gateway for use in a system having a user with a PPP connection to the gateway. User 130 has a PPP connection to gateway 132. The gateway 132 then contains many parts that interface the user 130 to multiple networks. A request receiver 134 receives a first PPP connection request from the user. An LCP negotiator 136 negotiates LCP options between the user and a first network. A network session initiator 138 establishes a primary PPP session between the user and a first network while a network address receiver 140 receives a first real network address for the user, the first real network address assigned by the first network. The request receiver 134 further receives a second PPP connection request from the user. The LCP negotiator 136 further negotiates LCP options between the user and a second network. The network session initiator 138 further establishes a secondary network session between the gateway and a second network and the network address receiver 140 further receives a second real network address for the user, the second real network address assigned by the second network.

The gateway may also contain a network address translation table 142 having multiple entries 144. A NAT table storer 146 may then store the second real network address in the network address translation table 132 in an entry 144 corresponding to the first real network address.

Figure 6:
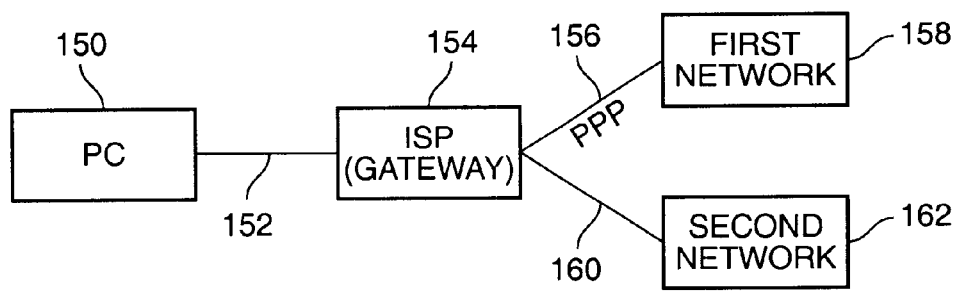
FIG. 6 is a block diagram illustrating multiple network connections from a single PPP connection as they would appear after the steps depicted in FIG. 4 were executed in accordance with a presently preferred embodiment of the present invention.

FIG. 6 is a block diagram illustrating multiple network connections from a single PPP connection as they would appear after the steps depicted in FIG. 4 were executed. PC 150 maintains the PPP connection to the ISP 154, which may contain the gateway. Primary PPP session 156 links the PC to the first network 158, while secondary network connection 160 connects the gateway to the second network.

The gateway may configure more than one secondary network sessions should the user so desire. These additional secondary network sessions are created in a similar fashion to the original secondary network session.

Additionally, "tunneling" may be utilized in the case where not all the links follow the same protocol. Tunneling allows two hosts on the same type of network to communicate even though there may be different types of network in between. Tunneling is accomplished by encapsulating packets sent from a first type of network within packets of a type compatible with a second type of network for the duration of the packet's journey through the second type of network. Then, the outer packet is stripped off (and possibly some demultiplexing takes place) when the packet reaches the first type of network again. Layer Two Tunneling Protocol (L2TP) is a specific tunneling protocol that acts as an extension to the PPP protocol to allow ISPs to operate virtual private networks. L2TP or any other tunneling protocol may be used when establishing the primary and secondary sessions.

Figure 7:
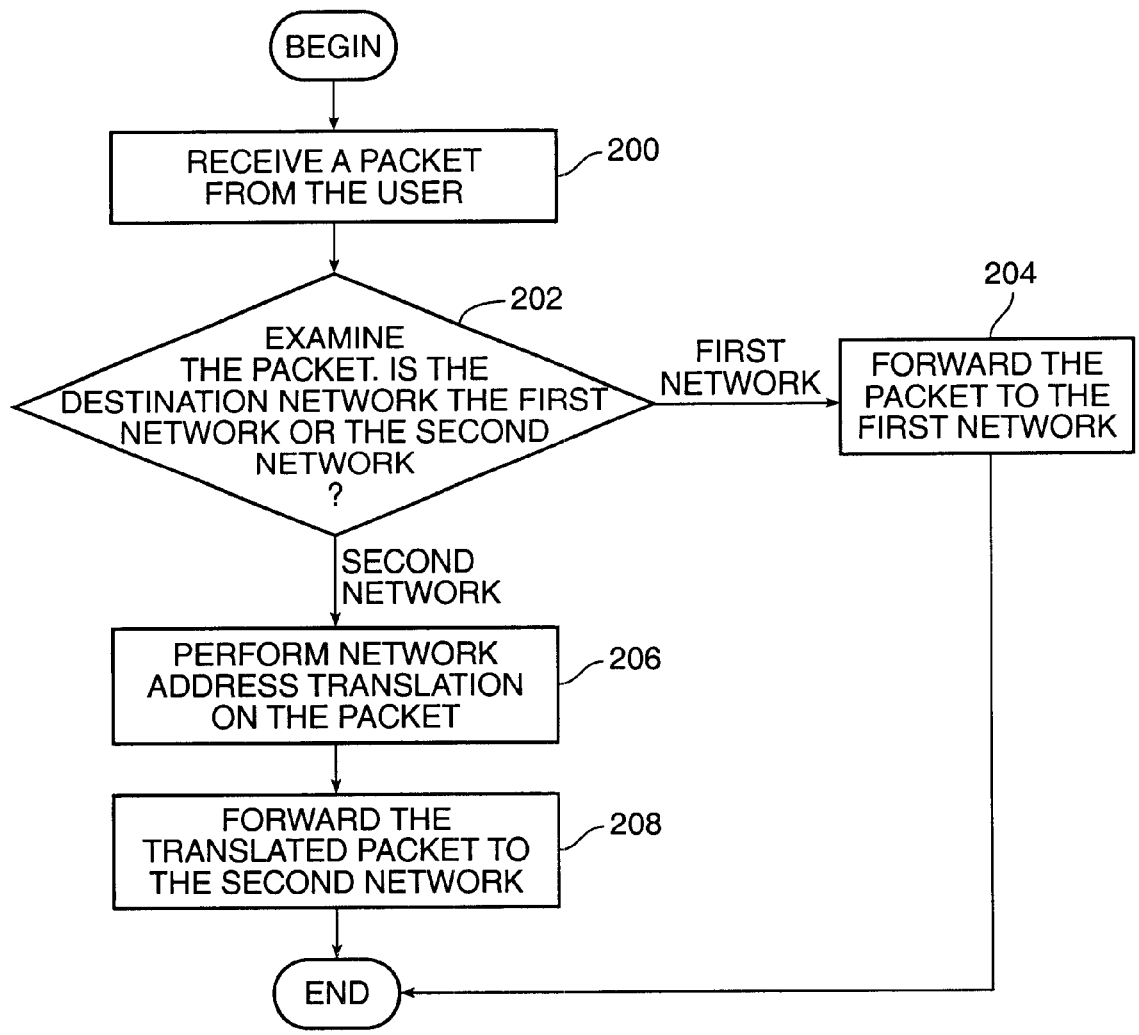
FIG. 7 is a flow diagram illustrating a method for outgoing communications routing in a system in which a user is connected to a first network and a second network according to a presently preferred embodiment of the present invention.

FIG. 7 is a flow diagram illustrating a method for outgoing communications routing in a system in which a user is connected to a first network and a second network according to a presently preferred embodiment of the invention.

Figure 8:
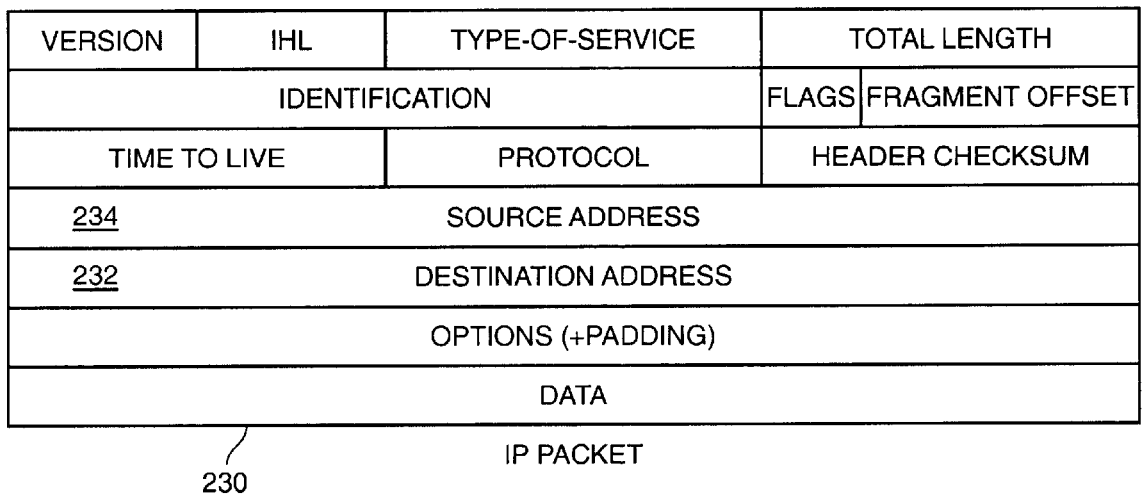
FIG. 8 is a diagram of a packet in accordance with the IP protocol.

At step 200, a packet is received from the user. At step 202, the packet is examined to determine if its destination is the first network or the second network. FIG. 8 is a diagram illustrating a packet in accordance with the IP protocol. Normally, there will be a destination network address field 232 within the packet 230. The destination network address may then be extracted from this field. Then the address may be compared with a routing table. This routing table may be maintained by the gateway or a router. The routing table contains a list of addresses and the corresponding networks to which packets sent to that address should be routed. This allows the gateway to forward the packets to the correct network. In many cases, routing the packets to either network will allow the packet to arrive at its destination. In these cases, the routing table may indicate the network that will provide for the shortest travel time for the packet, in order to save the user some time. In yet other cases, it will not be clear to which network to send the packet (indicated by the fact that there is no entry for the address in the routing table). In these cases, a default network will be established to which to send packets.

Referring back to FIG. 7, if the destination network is the first network, then at step 204 the packet is directly forwarded to the first network. If, however, the destination network is the second network, then at step 206 network address translation is performed (perhaps by applying a network address translation mapping scheme to the packet or perhaps by looking up the destination address in a NAT table) to modify the source network address. At step 208, the packet is then forwarded to the second network. A similar scheme may be utilized when there are more than two simultaneous network connections, with NAT being performed on each network connection but the primary one.

Figure 9:
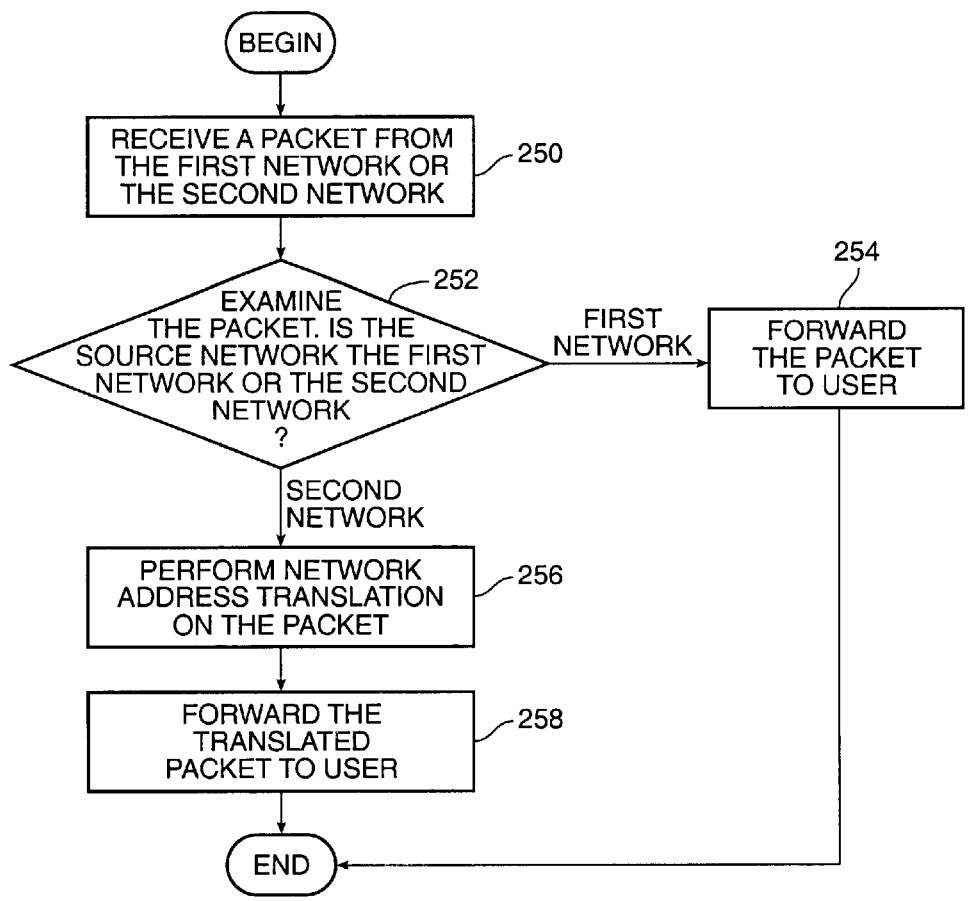
FIG. 9 is a flow diagram illustrating a method for incoming communications routing of in a system in which a user is connected to a first network and a second network according to a presently preferred embodiment of the present invention.

Likewise, when a packet is received from the second network (or any other of the secondary sessions), then network address translation is performed. FIG. 9 is a flow diagram illustrating a method for incoming communications routing of in a system in which a user is connected to a first network and a second network. At step 250, a packet is received from the first network or the second network. At step 252, the packet is examined to determine the source network. Referring back to FIG. 8, like the destination address, the source address of the packet is generally located within a field 234 in the packet 230. Referring to FIG. 9, if the source is the first network, the packet is simply forwarded to the user at step 254. If, however, the source is the second network (or any other secondary sessions), network address translation is performed on the packet at step 256. Then the packet is forwarded to the user at step 258.

Figure 10:
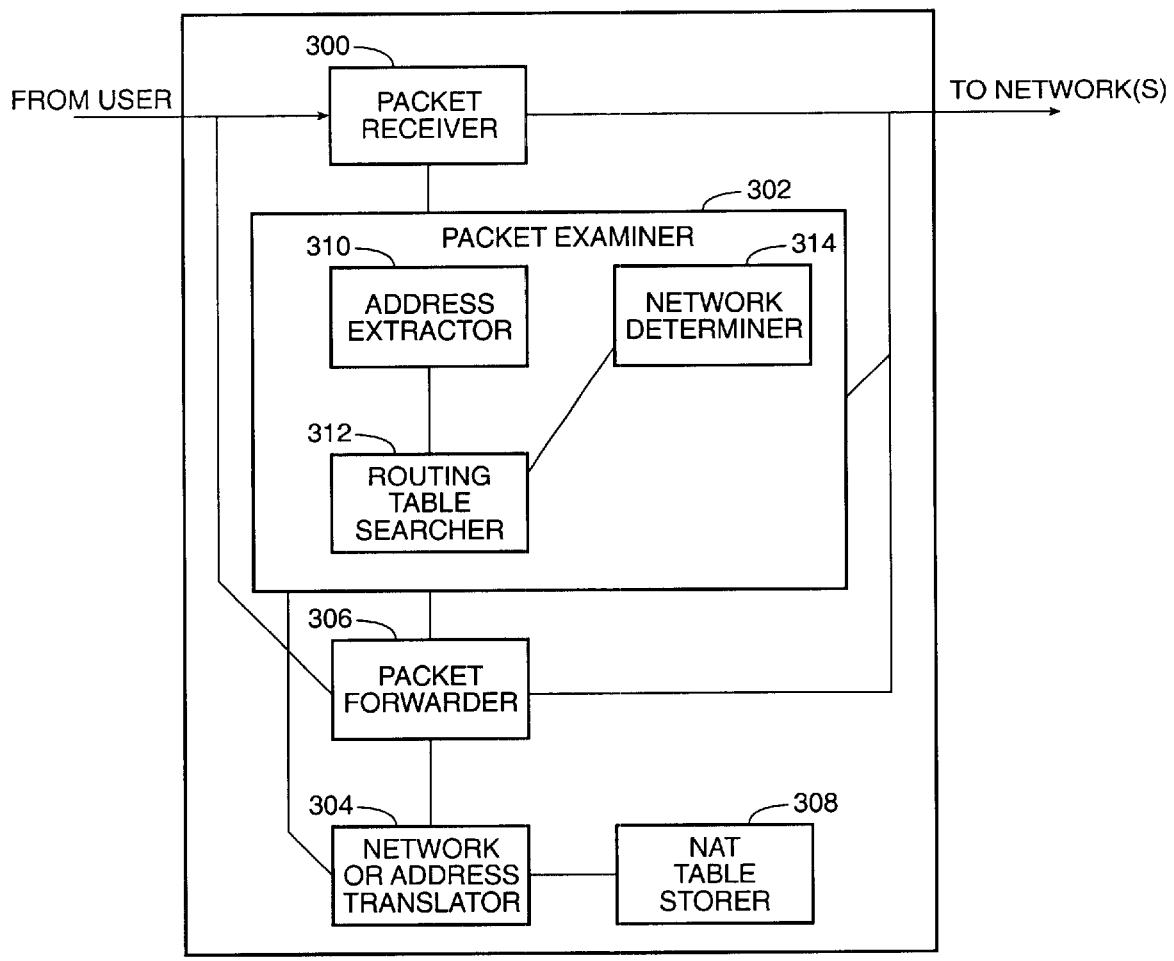
FIG. 10 is a block diagram illustrating a network in accordance with another embodiment of the present invention.

FIG. 10 is a block diagram illustrating a network gateway according to another embodiment of the present invention. The components of this gateway may be combined with the gateway depicted in FIG. 5 for use as one complete gateway. A packet receiver 300 receives a packet sent by the user. Packet examiner 302 examines the packet to determine if its destination is the first network or the second network. Packet forwarder 304 forwards the packet to the first network if the packet indicates that its destination is the first network. Network address translator 306 performs network address translation on the packet if the packet indicates that its destination is the second network. The packet forwarder 304 further forwards the translated packet to the second network if the packet indicates that its destination is the second network.

Additionally, a NAT table storer 308 may be provided which stores the second real network address in a network address translation table in an entry corresponding to the first real network address. Packet examiner 302 further includes an address extractor 310, which extracts a destination network address from the packet, a routing table searcher 312, which looks up the destination network address in a routing table, and a network determiner 314, which determines that said destination is the first network or the second network based upon the listing for the destination network address in the routing table.

For incoming packets, the packet receiver 300 receives a second packet, the second packet sent from the first network or the second network. The packet examiner 302 further examines the second packet to determine if its source is the first network or the second network. The network address translator 304 performs network address translation on the second packet if the second packet indicates that its source is the second network. The packet forwarder 306 further forwards the second packet to the user.

The packet examiner 302 may further contain an address extractor 308, which extracts a destination network address from the packet, a routing table searcher 310, which looks up the destination network address in a routing table, and a network determiner 312, which determines that the destination is the first network or the second network based upon the listing for the destination network in the routing table. The network determiner 312 may further determine that the destination is the first network or second network based upon a default setting if the destination network address is not listed in the routing table.

The packet receiver 300 may further receive a second packet, the second packet sent from said first network or said second network. The packet examiner 302 may further examine said second packet to determine if its source is said first network or said second network. The network address translator 306 may further perform network address translation on said second packet if said second packet indicates that its source is said second network. The packet forwarder 304 may further forward said second packet to the user.

The present invention allows for the simultaneous connection to two or more network s from only one single PPP connection. It also allows for networks to be added at the time the user requests connection, such that the networks do not need to be preconfigured. The primary PPP connection to the first network is maintained without using network address translation, thus allowing for the use of applications that affect the header of the packets, thus providing more security when programs like IPSec are used. An additional increase in security is provided in that traffic to networks travel directly to the gateway rather than through one of the other simultaneously connected networks.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for establishing multiple network connections for a user having a PPP connection to a gateway, including the steps of:

establishing a primary PPP session between the user and a first network;

receiving a first real network address for said user, said first real network address assigned by said first network;

storing said first real network address in a non-network address translation table;

establishing a secondary network session between the gateway and a second network; and receiving a second real network address for the user, said second real network address assigned by said second network; and storing said second real network address in a network address translation table in an entry corresponding to said first real network address.

2. The method of claim 1, wherein said primary PPP session and said secondary network session are tunneling sessions.

3. The method of claim 2, wherein said primary PPP session and said secondary network session are L2TP sessions.

4. A method for establishing multiple network connections for a user having a PPP connection to a gateway, including the steps of:

receiving a first PPP connection request from the user;

negotiating LCP options between the user and a first network;

establishing a primary PPP session between the user and a first network;

receiving a first real network address for the user, said first real network address assigned by said first network;

storing said first real network address in a non-network address translation table;

receiving a second PPP connection request from the user;

negotiating LCP options between the user and a second network;

establishing a secondary PPP session between the gateway and a second network; and receiving a second real network address for the user, said second real network address assigned by said second network; and storing said second real network address in a network address translation table in an entry corresponding to said first real network address.

5. The method of claim 4, wherein said primary PPP session and said secondary network session are tunneling sessions.

6. The method of claim 5, wherein said primary PPP session and said secondary network session are L2TP sessions.

7. A method for communications routing in a system in which a user is connected to a first external network and a second external network, the method including the steps of:

receiving a packet sent from the user;

examining said packet to determine if its destination is the first network or the second network;

forwarding said packet directly to the first network if said packet indicates that its destination is the first network;

performing network address translation on said packet if said packet indicates that its destination is the second network; and forwarding said translated packet to the second network if said packet indicates that its destination is the second network.

8. The method of claim 7, wherein said examining step further includes the steps of:

extracting a destination network address from the packet;

looking up said destination network address in a routing table;

determining that said destination is the first or second network based upon the listing for the destination network address in the routing table; and determining that said destination is the first or second network based on a default setting if said destination network address is not listed in said routing table.

9. The method of claim 7, wherein said performing network address translation step includes the steps of:

extracting a source network address from the packet; and applying a network address translation mapping scheme to said source network address.

10. The method of claim 7, wherein said performing network address translation step includes the steps of:

extracting a source network address from the packet; and looking up said source network address in said network address translation table.

11. The method of claim 7, further including the steps of:

receiving a second packet, said second packet sent from said first network or said second network;

examining said second packet to determine if its source is said first network or said second network;

performing network address translation on said second packet if said second packet indicates that its source is said second network; and forwarding said second packet to the user.

12. A method for network communications in a system having a user with a PPP connection to a gateway, including the steps of:

establishing a primary PPP session between the user and a first external network;

receiving a first real network address for the user, said first real network address assigned by said first network;

establishing a secondary network session between the gateway and a second external network;

receiving a second real network address for the user, said second real network address assigned by said second network;

receiving a packet sent by the user;

examining said packet to determine if its destination is said first network or said second network;

forwarding said packet directly to the first network if said packet indicates that its destination is said first network;

performing network address translation on said packet if said packet indicates that its destination is said second network; and forwarding said translated packet to said second network if said packet indicates that its destination is said second network.

13. The method of claim 12, further including the step of storing said second real network address in a network address translation table in an entry corresponding to said first real network address.

14. The method of claim 13, wherein said performing network address translation step includes the steps of:

extracting a source network address from the packet; and looking up said source network address in said network address translation table.

15. The method of claim 12, wherein said primary PPP session and said secondary network session are tunneling sessions.

16. The method of claim 15, wherein said primary PPP session and said secondary network session are L2TP sessions.

17. The method of claim 12, wherein said examining step further includes the steps of:

extracting a destination network address from the packet;

looking up said destination network address in a routing table;

determining that said destination is the first or second network based upon the listing for the destination network address in the routing table; and determining that said destination is the first or second network based on a default setting if said destination network address is not listed in said routing table.

18. The method of claim 12, wherein said performing network address translation step includes the steps of:

extracting a source network address from the packet; and applying a network address translation mapping scheme to said source network address.

19. The method of claim 12, further including the steps of:

receiving a second packet, said second packet sent from said first network or said second network;

examining said second packet to determine if its source is said first network or said second network;

performing network address translation on said second packet if said second packet indicates that its source is said second network; and forwarding said second packet to the user.

20. A method for network communications in a system having a user with a PPP connection to a gateway, including the steps of:
  receiving a first PPP connection request from the user;
  negotiating LCP options between the user and a first external network;
  establishing a primary PPP session between the user and a first network;
  receiving a first real network address for the user, said first real network address assigned by said first network;
  receiving a second PPP connection request from the user;
  negotiating LCP options between the user and a second external network;
  establishing a secondary PPP session between the gateway and a second network;
  receiving a second real network address for the user, said second real network address assigned by said second network;
  receiving a packet sent by the user;
  examining said packet to determine if its destination is said first network or said second network;
  forwarding said packet directly to the first network if said packet indicates that its destination is said first network;
  performing network address translation on said packet if said packet indicates that its destination is said second network; and
  forwarding said translated packet to said second network if said packet indicates that its destination is said second network.

21. The method of claim 20, further including the steps of storing said second real network address in a network address translation table in an entry corresponding to said first real network address.

22. The method of claim 21, wherein said performing network address translation step includes the steps of: extracting a source network address from the packet; and looking up said source network address in said network address translation table.

23. The method of claim 20, wherein said primary PPP session and said secondary network session are tunneling sessions.

24. The method of claim 23, wherein said primary PPP session and said secondary network session are L2TP sessions.

25. The method of claim 20, wherein said examining step further includes the steps of:
  extracting a destination network address from the packet;
  looking up said destination network address in a routing table;
  determining that said destination is the first or second network based upon the listing for the destination network address in the routing table; and
  determining that said destination is the first or second network based on a default setting if said destination network address is not listed in said routing table.

26. The method of claim 20, wherein said performing network address translation step includes the steps of:
  extracting a source network address from the packet; and
  applying a network address translation mapping scheme to said source network address.

27. The method of claim 20, further including the steps of:
  receiving a second packet, said second packet sent from said first network or said second network;
  examining said second packet to determine if its source is said first network or said second network;
  performing network address translation on said second packet if said second packet indicates that its source is said second network; and
  forwarding said second packet to the user.

28. A network gateway for use in a system having a user with a PPP connection to the gateway, including:
  a network session initiator adapted to establish a primary PPP session between the user and a first network;
  a network address receiver adapted to receive a first real network address for the user, said first real network address assigned by said first network, and to store said first real network address in a non-network address translation table;
  said network session initiator further adapted to establish a secondary network session between the gateway and a second network; and
  said network address receiver further adapted to receive a second real network address for the user, said second real network address assigned by said second network, and to store said second real network address in a network address translation table in an entry corresponding to said first real network address.

29. The network gateway of claim 28, wherein said primary PPP session and said secondary network session are tunneling sessions.

30. The network gateway of claim 29, wherein said primary PPP session and said secondary network session are L2TP sessions.

31. A network gateway for use in a system having a user with a PPP connection to the gateway, including:
  a request receiver adapted to receive a first PPP connection request from the user;
  an LCP negotiator adapted to negotiate LCP options between the user and a first network;
  a network session initiator adapted to establish a primary PPP session between the user and a first network;
  a network address receiver adapted to receive a first real network address for the user, said first real network address assigned by said first network, and to store said first real network address in a non-network address translation table;
  said request receiver further adapted to receive a second PPP connection request from the user;
  said LCP negotiator further adapted to negotiate LCP options between the user and a second network;
  said network session initiator further adapted to establish a secondary PPP session between the user and a second network; and
  said network address receiver further adapted to receive a second real network address for the user, said second real network address assigned by said second network, and to store said second real network address in a network address translation table in an entry corresponding to said first real network address.

32. The network gateway of claim 31, wherein said primary PPP session and said secondary network sessions are tunneling sessions.

33. The network gateway of claim 32, wherein said primary PPP session and said secondary network session are L2TP sessions.

34. A network gateway including:
  a packet receiver adapted to receive a packet sent from a user;

a packet examiner adapted to examine said packet to determine if its destination is a first external network or a second external network;

a packet forwarder adapted to forward said packet directly to the first network if said packet indicates that its destination is said first network;

a network address translator adapted to perform network address translation on said packet if said packet indicates that its destination is said second network; and said packet forwarder further adapted to forward said translated packet to said second network if said packet indicates that its destination is said second network.

35. The network gateway of claim 34, wherein said packet examiner further includes:

an address extractor adapted to extract a destination network address from said packet;

a routing table searcher adapted to look up said destination network address in a routing table;

a network determiner adapted to determine that said destination is said first network or said second network based upon the listing for the destination network address in the routing table; and said network determiner further adapted to determine that said destination is said first network or said second network based on a default setting if said destination network address is not listed in said routing table.

36. The network gateway of claim 34, wherein said network address translator is further adapted to extract a source network address from the packet and apply a network address translation mapping scheme to said source network address.

37. The network gateway of claim 34, wherein said network address translator is further adapted to extract a source network address from the packet and look up said source network address in a network address translation table.

38. The network gateway of claim 34, wherein said packet receiver further is adapted to receive a second packet, said second packet sent from said first network or said second network, said packet examiner is further adapted to examine said second packet to determine if its source is said first network or said second network, said network address translator is further adapted to perform network address translation on said second packet if said second packet indicates that its source is said second network, and said packet forwarder is further adapted to forward said second packet to the user.

39. A network gateway for use in a system having a user with a PPP connection to the gateway, including:

a network session initiator adapted to establish a primary PPP session between the user and a first external network;

a network address receiver adapted to receive a first real network address for the user, said first real network address assigned by said first network;

said network session initiator further establish a secondary network session between the user and a second external network;

said network address receiver further receive a second real network address for the user, said second real network address assigned by said second network;

a packet receiver adapted to receive a packet sent by the user;

a packet examiner adapted to examine said packet to determine if its destination is said first network or said second network;

a packet forwarder adapted to forward said packet directly to the first network if said packet indicates that its destination is said first network;

a network address translator adapted to perform network address translation on said packet if said packet indicates that its destination is said second network; and said packet forwarder further adapted to forward said translated packet to said second network if said packet indicates that its destination is said second network.

40. The network gateway of claim 39, further including an NAT table storer adapted to store said second real network address in a network address translation table in an entry corresponding to said first real network address.

41. The network gateway of claim 40, wherein said network address translator is further adapted to extract a source network address from the packet and look up said source network address in a network address translation table.

42. The network gateway of claim 39, wherein said primary PPP session and said secondary network sessions are tunneling sessions.

43. The network gateway of claim 42, wherein said primary PPP session and said secondary network session are L2TP sessions.

44. The network gateway of claim 39, wherein said packet examiner further includes:

an address extractor adapted to extract a destination network address from said packet;

a routing table searcher adapted to look up said destination network address in a routing table;

a network determiner adapted to determine that said destination is said first network or said second network based upon the listing for the destination network address in the routing table; and said network determiner further adapted to determine that said destination is said first network or said second network based on a default setting if said destination network address is not listed in said routing table.

45. The network gateway of claim 39, wherein said network address translator is further adapted to extract a source network address from the packet and apply a network address translation mapping scheme to said source network address.

46. The network gateway of claim 39, wherein said packet receiver is further adapted to receive a second packet, said second packet sent from said first network or said second network, said packet examiner is further adapted to examine said second packet to determine if its source is said first network or said second network, said network address translator is further adapted to perform network address translation on said second packet if said second packet indicates that its source is said second network, and said packet forwarder is further adapted to forward said second packet to the user.

47. A network gateway for use in a system having a user with a PPP connection to the gateway, including:

a request receiver adapted to receive a first PPP connection request from the user;

an LCP negotiator adapted to negotiate LCP options between the user and a first external network;

a PPP session initiator adapted to establish a primary PPP session between a user and a first network;

a network address receiver adapted to receive a first real network address for the user, said first real network address assigned by said first network;

said request receiver further adapted to receive a second PPP connection request from the user;

said LCP negotiator further adapted to negotiate LCP options between the user and a second external network;

said PPP session initiator further adapted to establish a secondary PPP session between the user and a second network;

said network address receiver further adapted to receive a second real network address for the user, said second real network address assigned by said second network;

a packet receiver adapted to receive a packet sent by the user;

a packet examiner adapted to examine said packet to determine if its destination is said first network or said second network;

a packet forwarder adapted to forward said packet directly to the first network if said packet indicates that its destination is said first network;

a network address translator adapted to perform network address translation on said packet if said packet indicates that its destination is said second network; and said packet forwarder further adapted to forward said translated packet to the second network if said packet indicates that its destination is said second network.

48. The network gateway of claim 47, further including an NAT table storer adapted to store said second real network address in a network address translation table in an entry corresponding to said first real network address.

49. The network gateway of claim 48, wherein said network address translator is further adapted to extract a source network address from the packet and look up said source network address in a network address translation table.

50. The network gateway of claim 47, wherein said primary PPP session and said secondary network sessions are tunneling sessions.

51. The network gateway of claim 50, wherein said primary PPP session and said secondary network session are L2TP sessions.

52. The network gateway of claim 47, wherein said packet examiner further includes:

an address extractor adapted to extract a destination network address from said packet;

a routing table searcher adapted to look up said destination network address in a routing table;

a network determiner adapted to determine that said destination is said first network or said second network based upon the listing for the destination network address in the routing table; and said network determiner further adapted to determine that said destination is said first network or said second network based on a default setting if said destination network address is not listed in said routing table.

53. The network gateway of claim 47, wherein said network address translator is further adapted to extract a source network address from the packet and apply a network address translation mapping scheme to said source network address.

54. The network gateway of claim 47, wherein said packet receiver is further adapted to receive a second packet, said second packet sent from said first network or said second network, said packet examiner is further adapted to examine said second packet to determine if its source is said first network or said second network, said network address translator is further adapted to perform network address translation on said second packet if said second packet indicates that its source is said second network, and said packet forwarder is further adapted to forward said second packet to the user.

55. A program storage device readable by a machine, tangibly embodying a program of instructions executable by the machine to perform method steps for establishing multiple network connections for a user having a PPP connection to a gateway, said method steps including the steps of:

establishing a primary PPP session between the user and a first network;

receiving a first real network address for said user, said first real network address assigned by said first network;

storing said first real network address in a non-network address translation table;

establishing a secondary network session between the gateway and a second network; and receiving a second real network address for the user, said second real network address assigned by said second network; and storing said second real network address in a network address translation table in an entry corresponding to said first real network address.

56. The program storage device of claim 55, wherein the method further includes the step of storing said second real network address in a network address translation table in an entry corresponding to said first real network address.

57. The program storage device of claim 55, wherein said primary PPP session and said secondary network session are tunneling sessions.

58. The program storage device of claim 57, wherein said primary PPP session and said secondary network session are L2TP sessions.

59. A program storage device readable by a machine, tangibly embodying a program of instructions executable by the machine to perform method steps for establishing multiple network connections for a user having a PPP connection to a gateway, said method steps including the steps of:

receiving a first PPP connection request from the user;

negotiating LCP options between the user and a first network;

establishing a primary PPP session between the user and a first network;

receiving a first real network address for the user, said first real network address assigned by said first network;

storing said first real network address in a non-network address translation table;

receiving a second PPP connection request from the user;

negotiating LCP options between the user and a second network;

establishing a secondary PPP session between the gateway and a second network; and receiving a second real network address for the user, said second real network address assigned by said second network; and storing said second real network address in a network address translation table in an entry corresponding to said first real network address.

60. The program storage device of claim 59, wherein the method further includes the step of storing said second real network address in a network address translation table in an entry corresponding to said first real network address.

61. The program storage device of claim 59, wherein said primary PPP session and said secondary network session are tunneling sessions.

62. The program storage device of claim 61, wherein said primary PPP session and said secondary network session are L2TP sessions.

63. A program storage device readable by a machine, tangibly embodying a program of instructions executable by the machine to perform method steps for communications routing in a system in which a user is connected to a first external network and a second external network, the method including the steps of:

receiving a packet sent from the user;

examining said packet to determine if its destination is the first network or the second network;

forwarding said packet directly to the first network if said packet indicates that its destination is the first network;

performing network address translation on said packet if said packet indicates that its destination is the second network; and forwarding said translated packet to the second network if said packet indicates that its destination is the second network.

64. The program storage device of claim 63, wherein said examining step further includes the steps of:

extracting a destination network address from the packet;

looking up said destination network address in a routing table;

determining that said destination is the first or second network based upon the listing for the destination network address in the routing table; and determining that said destination is the first or second network based on a default setting if said destination network address is not listed in said routing table.

65. The program storage device of claim 63, wherein said performing network address translation step includes the steps of:

extracting a source network address from the packet; and applying a network address translation mapping scheme to said source network address.

66. The program storage device of claim 63, wherein said performing network address translation step includes the steps of:

extracting a source network address from the packet; and looking up source network address in said network address translation table.

67. The program storage device of claim 63, wherein the method further includes the steps of:

receiving a second packet, said second packet sent from said first network or said second network;

examining said second packet to determine if its source is said first network or said second network;

performing network address translation on said second packet if said second packet indicates that its source is said second network; and forwarding said second packet to the user.

68. A program storage device readable by a machine, tangibly embodying a program of instructions executable by the machine to perform method steps for network communications in a system having a user with a PPP connection to a gateway, the method including the steps of:

establishing a primary PPP session between the user and a first external network;

receiving a first real network address for the user, said first real network address assigned by said first network;

establishing a secondary network session between the gateway and a second external network;

receiving a second real network address for the user, said second real network address assigned by said second network;

receiving a packet sent by the user;

examining said packet to determine if its destination is said first network or said second network;

forwarding said packet directly to the first network if said packet indicates that its destination is said first network;

performing network address translation on said packet if said packet indicates that its destination is said second network; and forwarding said translated packet to said second network if said packet indicates that its destination is said second network.

69. The program storage device of claim 68, wherein the method further includes the step of storing said second real network address in a network address translation table in an entry corresponding to said first real network address.

70. The program storage device of claim 69, wherein said performing network address translation step includes the steps of:

extracting a source network address from the packet; and looking up said source network address in said network address translation table.

71. The program storage device of claim 68, wherein said primary PPP session and said secondary network session are tunneling sessions.

72. The program storage device of claim 71, wherein said primary PPP session and said secondary network session are L2TP sessions.

73. The program storage device of claim 69, wherein said examining step further includes the steps of:

extracting a destination network address from the packet;

looking up said destination network address in a routing table;

determining that said destination is the first or second network based upon the listing for the destination network address in the routing table; and determining that said destination is the first or second network based on a default setting if said destination network address is not listed in said routing table.

74. The program storage device of claim 69, wherein said performing network address translation step includes the steps of:

extracting a source network address from the packet; and applying a network address translation mapping scheme to said source network address.

75. The program storage device of claim 69, wherein the method further includes the steps of:

receiving a second packet, said second packet sent from said first network or said second network;

examining said second packet to determine if its source is said first network or said second network;

performing network address translation on said second packet if said second packet indicates that its source is said second network; and forwarding said second packet to the user.

76. A program storage device readable by a machine, tangibly embodying a program of instructions executable by the machine to perform method steps for network communications in a system having a user with a PPP connection to a gateway, the method including the steps of:

receiving a first PPP connection request from the user;
negotiating LCP options between the user and a first external network;
establishing a primary PPP session between the user and a first network;
receiving a first real network address for the user, said first real network address assigned by said first network;
receiving a second PPP connection request from the user;
negotiating LCP options between the user and a second external network;
establishing a secondary PPP session between the gateway and a second network;
receiving a second real network address for the user, said second real network address assigned by said second network;
receiving a packet sent by the user;
examining said packet to determine if its destination is said first network or said second network;
forwarding said packet directly to the first network if said packet indicates that its destination is said first network;
performing network address translation on said packet if said packet indicates that its destination is said second network; and
forwarding said translated packet to said second network if said packet indicates that its destination is said second network.

77. The program storage device of claim 76, wherein the method further includes the step of storing said second real network address in a network address translation table in an entry corresponding to said first real network address.

78. The program storage device of claim 77, wherein said performing network address translation step includes the steps of: extracting a source network address from the packet; and looking up said source network address in said network address translation table.

79. The program storage device of claim 77, wherein the method further includes the steps of:
receiving a second packet, said second packet sent from said first network or said second network;
examining said second packet to determine if its source is said first network or said second network;
performing network address translation on said second packet if said second packet indicates that its source is said second network; and
forwarding said second packet to the user.

80. The program storage device of claim 77, wherein said primary PPP session and said secondary network session are tunneling sessions.

81. The program storage device of claim 80, wherein said primary PPP session and said secondary network session are L2TP sessions.

82. The program storage device of claim 77, wherein said examining step further includes the steps of:
extracting a destination network address from the packet;
looking up said destination network address in a routing table;
determining that said destination is the first or second network based upon the listing for the destination network address in the routing table; and
determining that said destination is the first or second network based on a default setting if said destination network address is not listed in said routing table.

83. The program storage device of claim 77, wherein said performing network address translation step includes the steps of:
extracting a source network address from the packet; and
applying a network address translation mapping scheme to said source network address.

84. A network gateway for network communications in a system having a user with a PPP connection to the gateway, including:
means for establishing a primary PPP session between the user and a first external network;
means for receiving a first real network address for the user, said first real network address assigned by said first network;
means for establishing a secondary network session between the gateway and a second external network;
means for receiving a second real network address for the user, said second real network address assigned by said second network;
means for receiving a packet sent by the user;
means for examining said packet to determine if its destination is said first network or said second network;
means for forwarding said packet directly to the first network if said packet indicates that its destination is said first network;
means for performing network address translation on said packet if said packet indicates that its destination is said second network; and
means for forwarding said translated packet to said second network if said packet indicates that its destination is said second network.

85. The network gateway of claim 84, further including means for storing said second real network address in a network address translation table in an entry corresponding to said first real network address.

86. The network gateway of claim 85, wherein said means for performing network address translation include means for extracting a source network address from the packet and means for looking up said source network address in said network address translation table.

87. The network gateway of claim 84, wherein said primary PPP session and said secondary network session are tunneling sessions.

88. The network gateway of claim 87, wherein said primary PPP session and said secondary network session are L2TP sessions.

89. The network gateway of claim 84, wherein said examining step further includes the steps of:
extracting a destination network address from the packet;
looking up said destination network address in a routing table;
determining that said destination is the first or second network based upon the listing for the destination network address in the routing table; and
determining that said destination is the first or second network based on a default setting if said destination network address is not listed in said routing table.

90. The network gateway of claim 84, wherein said means for performing network address translation include means for extracting a source network address from the packet and means for applying a network address translation mapping scheme to source destination network address.

91. The network gateway of claim 84, further including:
means for receiving a second packet, said second packet sent from said first network or said second network;
means for examining said second packet to determine if its source is said first network or said second network;
means for performing network address translation on said second packet if said second packet indicates that its source is said second network; and
means for forwarding said second packet to the user.

* * * * *